United States Patent [11] 3,571,557

[72] Inventor Lamar T. Valentine
 Tulsa, Okla.
[21] Appl. No. 812,042
[22] Filed Apr. 1, 1969
[45] Patented Mar. 23, 1971
[73] Assignee Welding Process Company
 Tulsa, Okla.

[54] WELDING TORCH OSCILLATOR
 1 Claim, 5 Drawing Figs.
[52] U.S. Cl. ................................................. 219/130,
 219/76, 219/124
[51] Int. Cl. ....................................................... B23k 9/00
[50] Field of Search ............................................ 219/124,
 125, 76, 130

[56] References Cited
 UNITED STATES PATENTS
1,884,644 10/1932 Ford .............................. 219/125
2,921,179 1/1960 Anderson ..................... 219/125
3,019,327 1/1962 Engel ............................. 219/124
3,162,161 12/1964 Verbeek ........................ 219/125
3,185,814 5/1965 Rossner ......................... 219/76

Primary Examiner—Milton O. Hirshfield
Assistant Examiner—R. Skudy
Attorney—Head & Johnson ABSTRACT: A welding torch oscillator includes linkage from an electric motor drive. One portion of the linkage includes a slot within which is a movable fulcrum, the position of which varies the ultimate width of torch oscillation. The fulcrum is a bearing member which is attached to a nut through which a fixed threaded shaft is rotatable. A hand knob attached to the shaft permits immediate adjustment to a desired oscillation.

INVENTOR.
LAMAR T. VALENTINE
BY
*Head & Johnson*
ATTORNEYS

PATENTED MAR 23 1971 3,571,557

INVENTOR.
LAMAR T. VALENTINE
BY
*Head & Johnson*
ATTORNEYS

WELDING TORCH OSCILLATOR

BACKGROUND

The oscillation of a welding torch relative to materials being e welded has and still is in many instances done by hand. In welding relatively thick work it is highly desirable to weld with a series of passes until the weld has filled the space between the material. As such it is necessary to adjust the width of the weld oscillation for each succeeding pass.

SUMMARY

This invention provides a welding torch oscillator in which provision is made to readily adjust the width of the welding torch oscillation as needed.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
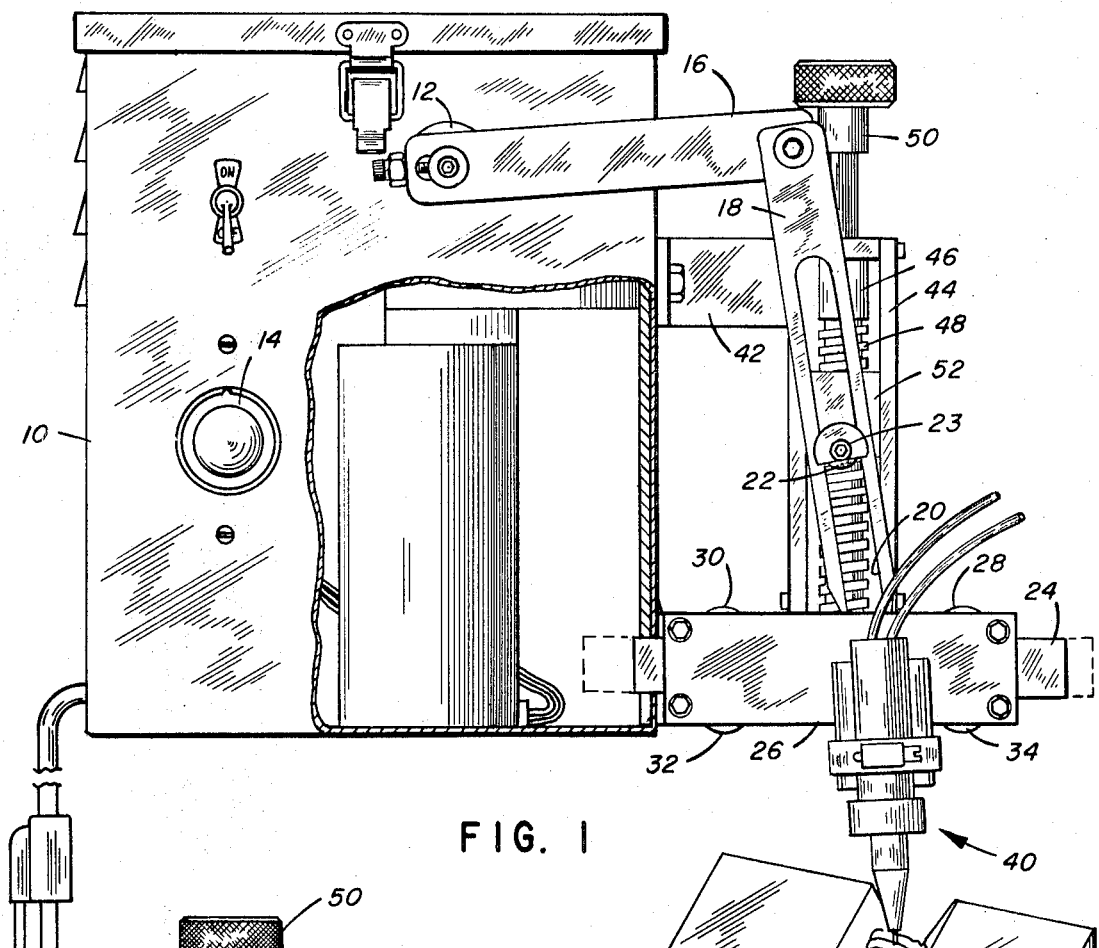
FIG. 1 is a front elevational view, partly broken away describing the apparatus of this invention.
Figure 2:
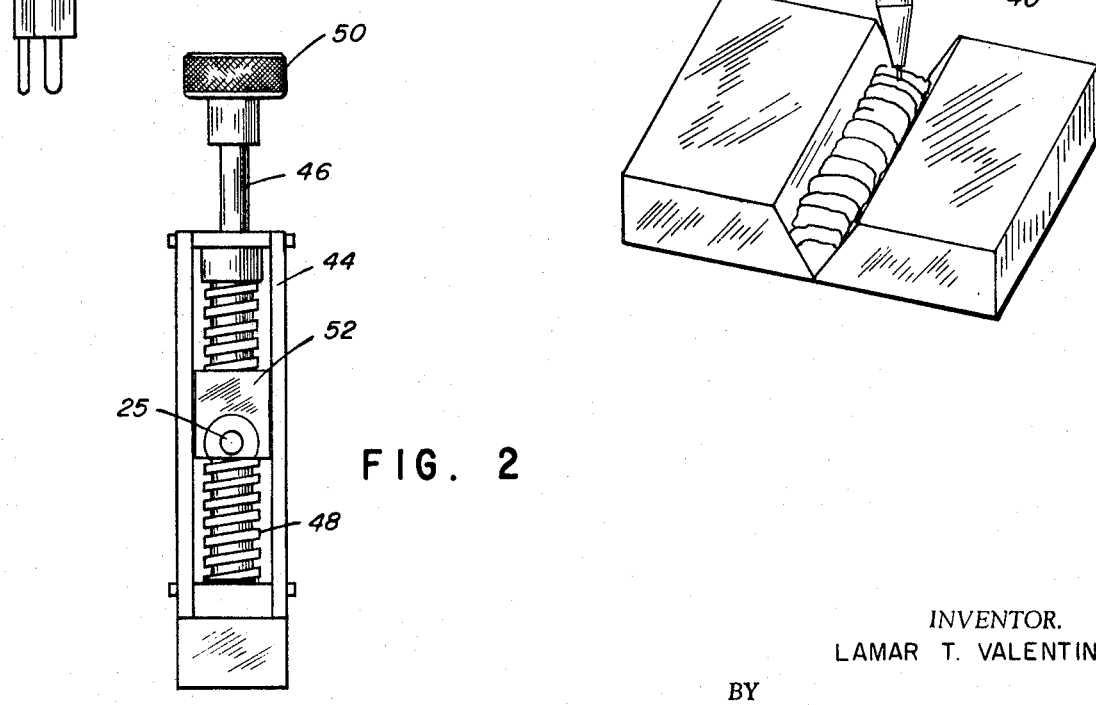
FIG. 2 is a front view of the oscillation adjustment mechanism.

Referring to FIG. 1 the apparatus of this invention includes a closure 10 within which is a mechanism for providing rotary movement to an output eccentric 12. The motor usually interconnects to the shaft through a speed reducer and by the provision of a rheostat 14 various speeds of the output eccentric 12 may be obtained. Crank arm 16 is attached to the eccentric 12 for converting rotary movement into rectilinear. Pivotally connected to the outer end of crank arm 16 is oscillator arm 18. The arm is slotted at 20 within which fulcrum bearing 22 rides. The lower end of the oscillator arm is pivotally connected to slide 24 which is supported within housing 26 for reciprocating movement between rollers 28, 30, 32 and 34. The welding torch head generally designated by the numeral 40 is clamped to slide 24 for movement therewith. Preferably this invention has found its best use in conjunction with continuous wire fed types of welding guns where it is necessary that precise control be had over the gun relative to the weld path. Rearwardly of the oscillator arm 18 and supported by a bracket 42 to the housing 10 is the fulcrum adjustment mechanism shown best in FIG. 2. Framework 2 44 rotatably supports shaft 46 which includes square threads 48. A hand knob 50 is also attached to the shaft to cause the rotation. A nut 52 is retained within the housing 44 for sliding movement therein and hence move the fulcrum roller 22 which attaches by a bolt 23 in threaded opening 25.

Figure 3:
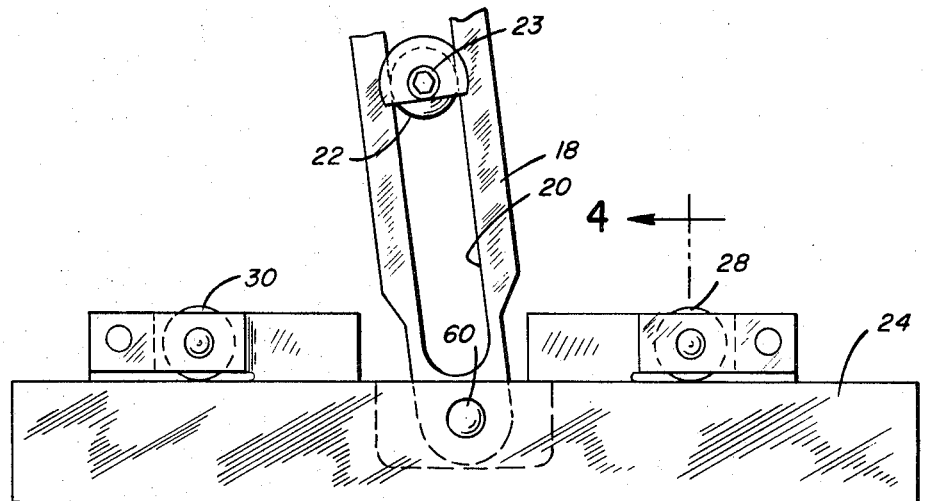
FIG. 3 is an enlarged partial view of the oscillating mechanism.
Figure 4:
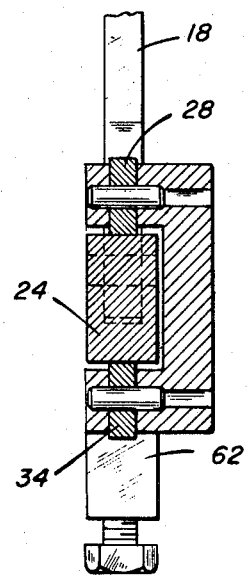
FIG. 4 is a sectional view taken along the line 4-4 of FIG. 3.

FIGS. 3 and 4 depict the interconnection of a oscillator arm 18 with slide 24 by pin 60. A torch attachment mechanism 62 is partially described.

Figure 5:
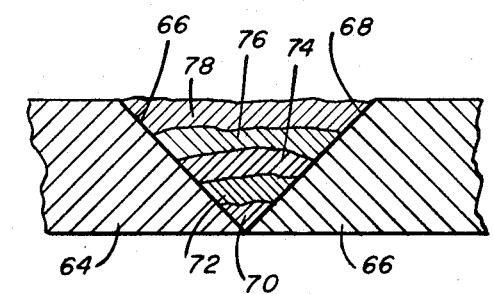
FIG. 5 is a s cross-sectional view of a weld depicting the typical use of this invention.

Referring now to FIG. 5, where it is desired to weld two work pieces 64 and 66 together which includes typical and respective beveled edges 66 and 68. Because of the thickness of the material a plurality of welds 70, 72, 74 and 78 are necessary to accomplish proper connection between the work pieces. As such it can be seen that the overall width of the first pass weld 70 is substantially smaller than that of the final pass weld 78 which must traverse across the full width of the bevel between surfaces 66 and 68. As such the oscillatory movement of the welding torch 40 may be varied by hand movement of knob 50 which in turn changes the position of fulcrum roller 22 relative to the oscillator arm 18. That is, as the fulcrum roller 22 is moved downward, the torch or gun 40 will oscillate back and forth a relatively short distance enlarging as the fulcrum roller 22 is moved upward within the slot 20.

I claim:

1. Apparatus to adjust the width of oscillation of a welding gun comprising:
    a gun holding slide, rollably supported for reciprocating movement;
    an oscillator arm, one end being pivotally connected to said slide, the other end being pivotally connected to a rectilinear moving crank arm, a longitudinal slot in said oscillator arm; and
    an adjustable fulcrum supported adjacent said oscillator arm comprising:

a hand rotatable threaded shaft;
    a nut longitudinally movable on or rotation of said shaft;
    a roller movable within said slot; and
    means to affix said roller to said nut for movement therewith to a desired setting.